United States Patent Office 2,859,836
Patented Nov. 11, 1958

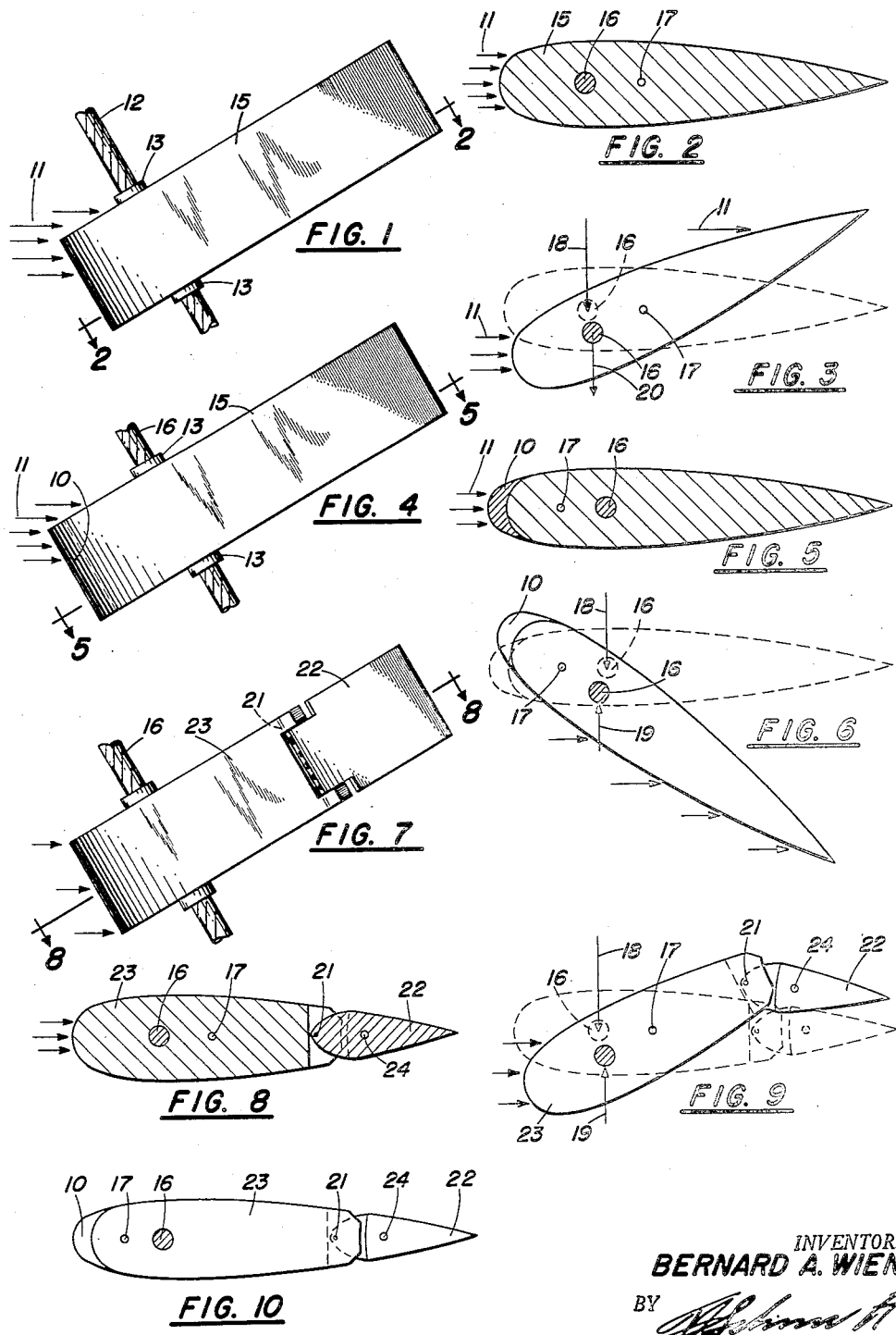

2,859,836

VIBRATION DAMPER FOR TOWED CABLES, PERISCOPES AND THE LIKE

Bernard A. Wiener, Washington, D. C.

Application February 28, 1955, Serial No. 491,231

6 Claims. (Cl. 188—1)

(Granted under Title 35, U. S. Code (1952), sec. 266)

The invention described herein may be manufactured and used by or for the Government of the United States of America for governmental purposes without the payment of any royalties thereon or therefor.

The present invention relates to a vibration damper for towed cables, periscopes and the like and more particularly to a vibration damper utilizing a streamlined fairing.

Towing cables, periscopes and the like suffer violent oscillations when they are moving with respect to a fluid stream particularly when the axis of the cable, periscope, or other moving object is at an angle of 45° or more with respect to the stream direction. Such oscillations appear to be associated with the Karman Street vortices shed by the moving object. In the past, long streamlined fairings through which the towing cable passed have been used. This construction although able to control wind or fluid flow actually accentuates the vibration of the cable, as will be shown infra.

The present invention utilizes a streamlined fairing which in one embodiment is provided with a mass that is situated to place the fairing center of gravity forward of the axis of rotation of the fairing about the cable, as a result of which upon a vibrational movement the fairing so places itself in the moving fluid that the force of the moving fluid upon the fairing opposes the initiating vibrational movement. In another embodiment a freely swinging hinged aileron is placed to the rear of a conventional fairing. Upon a vibrational movement of the fairing the aileron inherently moves to a position such that the resulting force of the moving fluid upon the fairing and aileron opposes the initiating vibrating force. In a last embodiment the features of the other embodiments are combined to give a very effective vibrational damper.

An object of the present invention is the provision of means cooperating with a moving fluid to counteract the vibrational forces produced on an object by a moving fluid.

Another object is to provide a fairing for a cable or the like which dampens the vibrational movements of the cable resulting from a moving fluid.

A further object of the invention is the provision of a fairing for a cable or the like which is in a moving fluid which will so move upon a vibration of the cable that the resultant force of the moving fluid upon the fairing opposes the vibration of the cable.

Still another object is to provide for a cable or the like which is in a moving fluid a fairing having a section which moves upon a vibration of the cable or the like to cooperate with the moving fluid to produce a force which opposes the vibrational movement.

A final object of the present invention is the provision for a cable or the like which is in a moving fluid of a fairing with aileron both of which move upon a vibration of the cable or the like to produce forces with the moving fluid to oppose the vibrational forces.

Other objects and many of the attendant advantages of this invention will be readily appreciated as the same becomes better understood by reference to the following detailed description when considered in connection with the accompaning drawings wherein:

Fig. 1 shows a perspective side view of a conventional fairing on a cable or the like, Fig. 2 is a section of Fig. 1 taken on the line 2—2 looking in the direction of the arrows, Fig. 3 is a displaced perspective top view of Fig. 1 superimposed upon a "phantom" of Fig. 1, Fig. 4 is a perspective side view of one embodiment of the fairing of this invention, Fig. 5 is a section view of Fig. 4 taken on line 5—5 looking in the direction of the arrows.

Fig. 6 is a displaced perspective top view of Fig. 4 superimposed upon a "phantom" of Fig. 4, Fig. 7 is a perspective side view of another embodiment of the fairing of this invention, Fig. 8 is a section view of Fig. 7 taken on line 8—8 looking in the direction of the arrows, Fig. 9 is a displaced perspective top view of Fig. 7 superimposed upon a "phantom" of Fig. 7, Fig. 10 shows a perspective top view of a fairing which combines the features of the other two embodiments.

Referring now to the drawings, wherein like reference characters designate like or corresponding parts throughout the several views, there is shown in Fig. 1 a conventional fairing 15 rotatably mounted on an object which could be a cable, periscope, or the like and for convenience is shown as a cable 12. Any conventional mounting means 13 are fixed to the cable 12 to prevent the fairing from sliding on the cable. The arrows 11 indicate the flow of a stream moving with respect to the cable. In Fig. 2, fairing 15 is shown to be freely rotatable about its axis of rotation 16 and to have a center of gravity 17. In Fig. 3, arrow 18 designates any vibrational force applied to the cable that displaces fairing 15 and arrow 20 is the force produced on the displaced fairing by the moving fluid 11. In Fig. 4, which shows one of the embodiments of this invention, the fairing is the same as that of Fig. 1 except for the addition of mass 10. The center of gravity 17 and the axis of rotation 16 for this fairing are shown in the sectional view of Fig. 5. In Fig. 6, arrow 18 represents any vibrational force which displaces the fairing and arrow 19 represents the force produced on the displaced fairing by the moving fluid 11. In Fig. 7 another embodiment of the invention is shown. The main body 23 of this fairing has a free-swinging hinged aileron portion 22. The hinge has a pin 21. In the sectional view of this embodiment shown in Fig. 8, the center of gravity 17 is for combined masses of the fairing and the aileron and the center of gravity 24 is for the aileron alone. In Fig. 9, arrow 18 represents any vibrational force which displaces the fairing and arrow 19 represents the resultant force produced by the moving fluid 11 on the displaced fairing. In Fig. 10, which is a top view of a fairing utilizing the combined features of the other two embodiments of this invention, the numerals employed in these other figures are used to indicate the same elements.

The effect of a vibrational force on a conventional fairing is shown in Fig. 3. In a conventional fairing the center of gravity is rearward of the axis of rotation. Assuming an initial condition of the fairing at rest, if a vibrational force 18 is applied to the fairing, the center of gravity 17 tends to remain at rest and thus the front of the fairing rotates around the center of gravity in the direction of the vibrational force. The resultant of the forces of the moving fluid 11 upon the displaced conventional fairing is a force 20 which is in the same direction as the initiating vibrational force 18. It is apparent that the same condition prevails if the initial vibrational force is in the opposite direction from that shown in Fig. 3. Since the force resulting from the fluid flow is in the same direction as the initiating vibrating force, the amplitude of vibrations is accentuated. In the embodiment of the invention shown in Fig. 4 a mass 10 is placed forward of the fairing so as to move the center of gravity 17 forward of the axis of rotation 16. The type or shape of mass is not critical: a fairly large weight can be affixed directly to the fairing as shown in Fig. 4 or a much smaller mass placed on a rod extending in front could be used. There are many equivalent and well-known means for moving the center of gravity forward, almost any of which would be suitable for this application. The effect of a vibrational force on this embodiment is shown in the top view of Fig. 6. When a vibrational force 18 is applied, the center of gravity 17 tends to remain at rest, thus the rear of the fairing rotates around the center of gravity in the direction of the vibrational force. If the angle to which the conventional fairing rotates is termed a positive angle, then the angle to which this embodiment rotates is a negative angle, thus since the flow direction is the same as in the conventional case, the resultant of the forces of the moving fluid is in a direction opposite to that of the conventional case, or in other words, opposing the initial vibrating force. Since the two forces subtract, the resultant vibrating force must be less than the initial vibrating force and the amplitude of the vibrations is diminished. In the embodiment of Fig. 7 a conventional fairing portion 23 and a conventional aileron 22 hinged on the rear of the fairing portion are used. The aileron can be hinged in any manner, the only necessary feature required is that the aileron be free-swinging. The effect of a vibrational force 18 on this embodiment is shown in the "phantom" and displaced top views of Fig. 9. The center of gravity 17 of the fairing portion plus aileron tends to remain at rest as do also, to a lesser degree, the center of gravity 24 of the aileron alone. This results in a "jackknife" displacement. The resultant of the forces of the moving stream upon this displaced section is a "lift force" 19. This "lift force" is a result of actions which are similar to those that give the "lift" to an airplane wing. Since this "lift force" 19 opposes the initiating vibrating force 18, the amplitude of vibrations of the cable is diminished. These two embodiments may be combined in a fairing which will have a top view as shown in Fig. 10. The operation of the embodiment of this figure should be apparent from the explanation of the other figures.

Three embodiments of the invention have been disclosed for damping out the vibrations that occur in a cable or the like which occur when a cable is in a fluid moving relative to the cable. One embodiment employs a conventional fairing rotatably mounted on the cable or the like which has a mass so positioned that the center of gravity is moved forward of the axis of rotation of the fairing about the cable. Another embodiment comprises a sectionated fairing rotatably mounted on a cable which utilizes a common air-flow principle to dampen vibrations. A third embodiment combines these other two embodiments to give a dampener which is more effective than the others.

Obviously many modifications and variations of the present invention are possible in the light of the above teachings. It is therefore to be understood that within the scope of the appended claims the invention may be practiced otherwise than as specifically described.

What is claimed is:

1. In combination with an object subject to vibration when moving through a fluid medium, a vibration damper for said object, and means mounting said damper on said object for free rotational movement thereon, said damper comprising a streamlined fairing having a blunt forward end and a tapering rearward end, the point of attachment to said mounting being rearward of the center of gravity of said fairing, the contour of the fairing being such that upon a movement of said object transverse to the moving fluid, the movement of the object is dampened.

2. The combination of claim 1 in which a mass is positioned on the forward end of said fairing, thereby shifting the center of gravity of said fairing forward of the rotatable connection.

3. The combination of claim 2 in which the forward end of said fairing is arcuate.

4. In combination with an object subject to vibration when moving through a fluid medium, a vibration damper for said object, said damper being comprised of a first fairing connected to said mounting means and an aileron freely rotatably hinged to the rear of said first fairing, and means mounting said damper on said object for free rotational movement thereon, said damper comprising a streamlined fairing having a blunt forward end and a tapering rearward end, the point of attachment to said mounting being forward of the geometric center of said fairing, the contour of the fairing being such that upon a movement of said object transverse to the moving fluid, the movement of the object is dampened.

5. The combination of claim 4 in which the center of gravity of the first fairing and aileron is rearward of the mounting means.

6. The combination of claim 4 in which a mass is positioned on the forward end of said first fairing for locating the center of gravity of the first fairing and aileron forward of the mounting means.

References Cited in the file of this patent

UNITED STATES PATENTS

| 2,081,957 | Roche | June 1, 1937 |
| 2,154,442 | Diehl | Apr. 18, 1939 |

FOREIGN PATENTS

| 17,530 | Great Britain | Dec. 15, 1915 |
| 108,535 | Great Britain | Aug. 14, 1917 |
| 515,318 | Great Britain | Dec. 1, 1939 |